United States Patent [19]
Taft

[11] Patent Number: 5,014,649
[45] Date of Patent: May 14, 1991

[54] CAT LITTER BOX WITH INTEGRAL, COLLAPSIBLE ENCLOSURE

[76] Inventor: Monte Taft, 5305 ½ Seashore Dr., Newport Beach, Calif. 92663

[21] Appl. No.: 192,142

[22] Filed: May 10, 1988

[51] Int. Cl.$^5$ .......................................... A01K 1/035
[52] U.S. Cl. ................................................ 119/168
[58] Field of Search ....................................... 119/1

[56] References Cited

U.S. PATENT DOCUMENTS

| | | | |
|---|---|---|---|
| 3,752,120 | 8/1973 | Pallesi | 119/1 |
| 4,029,048 | 6/1977 | Gershbein | 119/1 |
| 4,164,314 | 8/1979 | Edgar | 119/1 |
| 4,348,982 | 9/1982 | Selby | 119/1 |
| 4,624,380 | 11/1986 | Wernette | 119/1 X |
| 4,628,863 | 12/1986 | Eichenauer | 119/1 |
| 4,711,198 | 12/1987 | Mossbarger | 119/1 |
| 4,782,788 | 11/1988 | Arcand | 119/1 |
| 4,792,082 | 12/1988 | Williamson | 119/1 X |
| 4,800,842 | 1/1989 | Jones, Jr. | 119/1 |

*Primary Examiner*—Robert P. Swiatek
*Attorney, Agent, or Firm*—Kinney & Lange

[57] ABSTRACT

A pasteboard cat litter structure comprising a shallow, rectangular, plastic-lined, box-like base adapted for holding a quantity of cat litter. Attached to the top of the base is a collapsible enclosure shaped like a house. The enclosure comprises first and second opposite end panels which fold downwardly and inwardly along a lower crease line to lie flat atop the base when the enclosure is collapsed. The enclosure further comprises a continuous, central portion made up of first and second side panels and an enclosure roof. The central portion is constructed having two (2) opposing, longitudinal, side creases and a roof crest crease, which permit the central portion to be folded down, bellows-style, on top of the folded-down end panels. A flat, substantially closed structure, about the height of the base is then formed. A lid, similar in shape to the base is provided for covering the folded-down enclosure and base, the base fitting downwardly into the lid when the enclosure is erected. A partial cut-out in one side panel hinges outwardly or inwardly about a vertical crease to form an entrance into the enclosure when the enclosure is erected. The cat litter structure can be re-used or the enclosure can be collapsed and the lid installed so the entire structure can be disposed of with used litter inside.

14 Claims, 2 Drawing Sheets

CAT LITTER BOX WITH INTEGRAL, COLLAPSIBLE ENCLOSURE

BACKGROUND OF THE INVENTION

1. Field of the Invention

The present invention relates generally to the field of cat litter boxes and, more particularly, to disposable cat litter boxes which include means for covering the box and for shielding from view cats using the litter box.

2. Discussion of the Prior Art

One of the necessities of life for cat owners, especially those living in apartments, dormitories, rooming houses, and many urban townhouses and condominiums, is a cat litter box. As is well known, cat litter boxes are usually shallow boxes enabling the containing of a one or two inch layer of absorbent material called cat litter. Such cat litter material may be common sand, or may be "home made" from newspapers, paper towels, old rags, and the like. More commonly, however, commercial products (sold virtually everywhere, including supermarkets, hardware stores, drugstores, and convenience stores) are used because of the convenience, and because most commercial products combine highly absorbent materials with deodorizers.

Litter boxes vary considerably in type and cost. The most common and inexpensive types are merely shallow, usually rectangular, pasteboard or plastic containers that resemble box covers, and in many cases are just that. Without special treatment or liners, pasteboard litter boxes are usually not, however, very satisfactory even if they are of a disposable type, because they absorb waste products from the cat litter and become both weak and smelly. Plastic cat litter boxes are somewhat more practical than untreated or unlined pasteboard litter boxes; however, the cat litter must almost daily be replaced from the boxes (as well, of course, from any other type of reusable litter boxes) and they must frequently be washed to keep them clean. Neither the removal and disposal of used cat litter from cat litter boxes, nor the frequent washing of cat litter boxes is a particularly enjoyable task, especially for the squeamish. Moreover, the washing of cat litter boxes is not especially hygienic, since usually the only sink in an apartment or other small dwelling large enough to wash litter boxes in is in the kitchen sink. Otherwise, about the only other place to wash cat litter boxes (for people who do not have their own yards or patios) is the bathtub, which is also not particularly sanitary.

Another problem associated with most cat litter boxes is the mess that cats cause on the floor around litter boxes. Typically, cats like to dig and paw in litter boxes to find clean regions of litter and to cover their waste after using the litter. Even a large area litter box does little to prevent litter from being scattered out of the box onto the surrounding floor or carpet. To eliminate some of such problem, litter boxes are commonly placed on newspaper or the like, which protects the floor or carpet, but which usually do little to reduce the mess and, in fact, usually add to the messy appearance of the litter box area.

Providing a deeper litter box may reduce the amount of litter scattered outside of the box, but may, on the other hand, make the box too inconvenient for the cat to use. In such case, the inevitable result is that the animal finds other places, often such hidden and hard to find and clean places, as remote closet corners, under beds or other furniture, or piles of laundry, to perform their bodily functions. On the other hand, some less bashful and/or more anti-social cats may elect to use furniture, usually the piece which is most conspicuous, expensive and difficult to clean.

One solution to the scattered litter problem is to put a screen most of the way around the litter box. Such a screen not only confines the litter to a restricted area, but hides the litter box from view at all times, including times when a cat is using the box. The problem with screens is, however, that they cannot completely surround the litter box, for access to the box would be blocked; therefore, some litter can still be scattered out of the box. Moreover, free-standing screens can be knocked over and their effectiveness thereby eliminated.

A covered cat litter box having an entrance and exit for a cat is, for example, disclosed in U.S. Pat. No. 4,348,982 to J. W. Selby. While such litter box covers may be effective for the purpose intended, they are nevertheless very bulky. As a result, they take up a substantial amount of space when being shipped from the factory to wholesalers and/or retailers. In addition, such covers take up a great amount of storage space and display prior to purchase by a customer. After purchase, the disclosed type is too bulky to be easily stored in homes and is likewise difficult to dispose of.

Consequently, a need exists for an improved litter box having a built-in (or on) enclosure which does not take up any appreciable room except when it is actually being disposed for use by a household pet. It is, therefore, a principal objective of the present invention to provide such an improved cat litter box assembly having a collapsible enclosure enabling the assembly to be folded relatively flat when not in use.

SUMMARY OF THE INVENTION

According to the present invention, there is provided a collapsible, covered cat litter box apparatus, which comprises a relatively shallow litter box adapted for holding a quantity of cat litter or the like, and a collapsible enclosure attached to the top of the box. The box preferably includes a vapor barrier on the inside for keeping the box dry. The apparatus may be provided with the enclosure in the collapsed condition and with cat litter contained in the box. Both the litter box and the enclosure may be constructed of heavy pasteboard.

The enclosure is configured for folding and unfolding between an extended, use position, in which the enclosure at least substantially covers the cat litter box while permitting a cat to enter the enclosure and use the litter box; and, a collapsed, shipping, storage, and disposal condition, in which the housing lies flat on top of, or in, the litter box. In the preferred embodiment, there is included a relatively shallow cover for covering the litter box when the enclosure is in the collapsed condition.

Preferably, the enclosure comprises first and second end panels, lower edges which are foldably connected to corresponding upper edge regions of ends of the litter box. The enclosure then further comprises first and second side panels and a roof, the lower edges of the side panels being foldably connected to corresponding upper edge regions of sides of the litter box, and the side edges of the roof being foldably connected to corresponding upper edges of the side panels, so that the roof and side panels form one piece. Each of the side panels is constructed having a longitudinal fold line enabling the bellows-like folding and unfolding of the enclosure between the extended and collapsed conditions. There are also included means for detachably connecting upper edge regions of the end panels to end edge regions of the roof when the enclosure is in the extended condition.

At least one of the side and end panels is formed having means defining an opening through which a cat or the like can enter and exit the enclosure when the enclosure is in the extended condition. The outside of the enclosure may be decorated or printed so that the enclosure looks like a small house.

BRIEF DESCRIPTION OF THE DRAWING

The present invention may be more readily understood from the following detailed description when taken in conjunction with the accompanying drawing, in which.

DESCRIPTION OF THE PREFERRED EMBODIMENT

Figure 1:
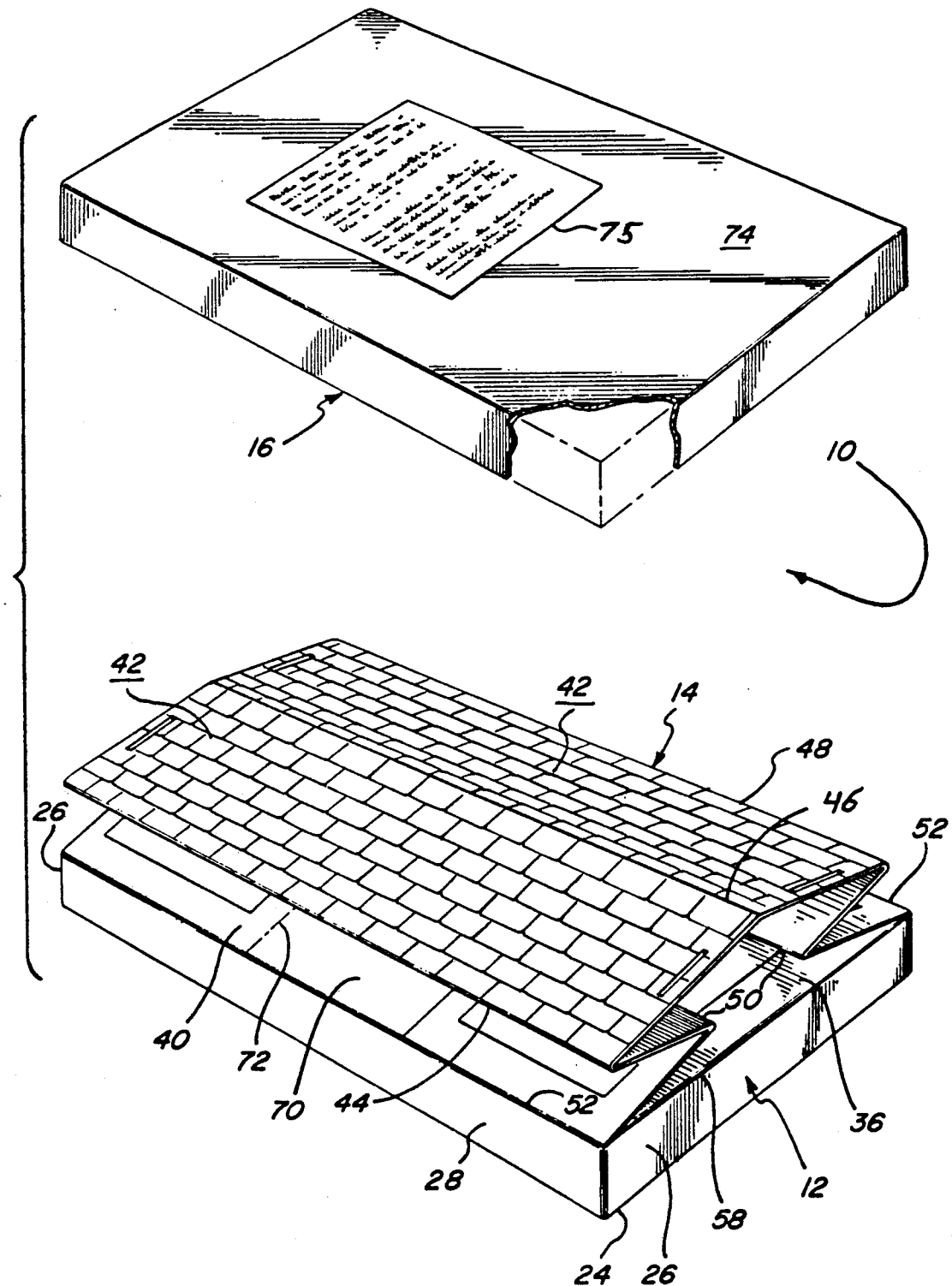
FIG. 1 is a perspective drawing of a collapsible, covered, disposable cat litter box apparatus showing the litter box and the enclosure attached to the top of the box, the enclosure being shown in a partially collapsed condition.

Generally comprising a cat litter box apparatus 10, in accordance with the present invention and as shown in FIG. 1, are a litter box 12, a collapsible enclosure 14, and a cover or lid 16. As more particularly described below, enclosure 14 is attached to the top edges of litter box 12 or, alternatively, is formed with the box in one (1) piece, as an extension of the litter box. Also, as described below, enclosure 14 is configured in the general shape of a miniature house and is constructed so as to be foldable and unfoldable between a collapsed condition in which the enclosure lies flat across the top of, or partially within, litter box 12; and, an extended condition in which the enclosure is erected above the litter box. Apparatus 10 may be provided with a suitable quantity of cat litter 20 (FIG. 3) already contained in litter box 12. Litter 20 may be provided in a sealed plastic pouch (not shown) in box 12, so that the litter does not spill from apparatus 10 during shipping and handling. Alternatively, litter apparatus 10 may be sold without litter 20, so that the customer can use his or her own cat litter.

When enclosure 14 is in the collapsed condition, litter box apparatus 10 is not significantly higher than litter box 12, and in such condition, cover 16 fits downwardly over the enclosure and onto litter box 12, thereby making a compact object suitable for shipping, storage, and disposal after use. With enclosure 14 in the extended condition, cat litter box apparatus 10 is ready for use. Preferably, litter box 12, enclosure 14, and cover 16 are constructed of heavy pasteboard (that is, corrugated cardboard), so as to be both strong and economical. Apparatus 10 may be sufficiently economical to be disposable after a single use, the enclosure being collapsed onto litter box 12, cover 16 installed on the collapsed enclosure and litter box 12, and the entire apparatus, with used litter 20 inside, may be conveniently disposed of when the litter has been used to the extent that its disposal is necessary. However, apparatus 10 may be constructed sufficiently rugged to enable repeated reuse after used litter 20 has been replaced in the litter box with fresh litter.

Figure 2:
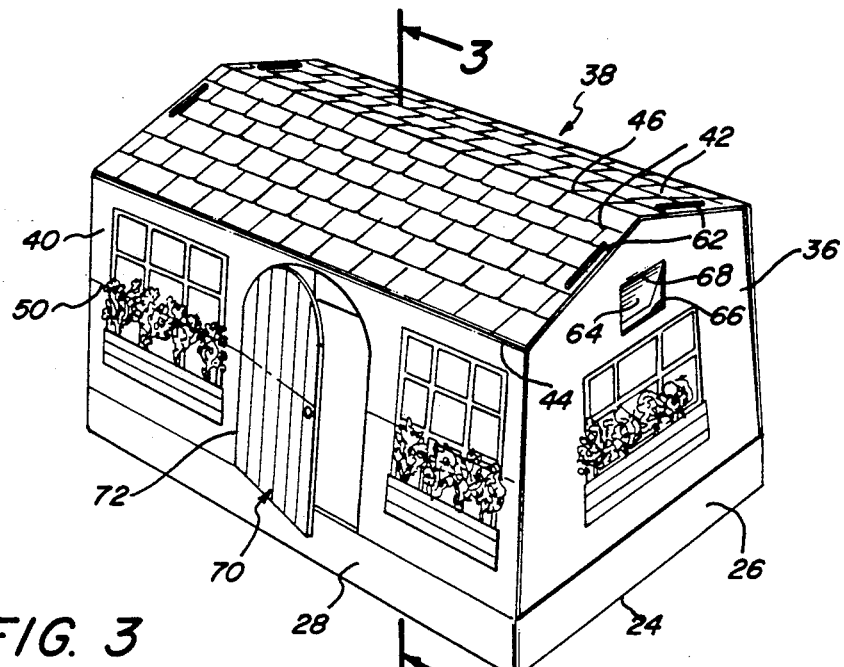
FIG. 2 is a perspective drawing of the collapsible, covered cat litter box apparatus of FIG. 1, showing the enclosure in its uncollapsed (erect) condition.
Figure 3:
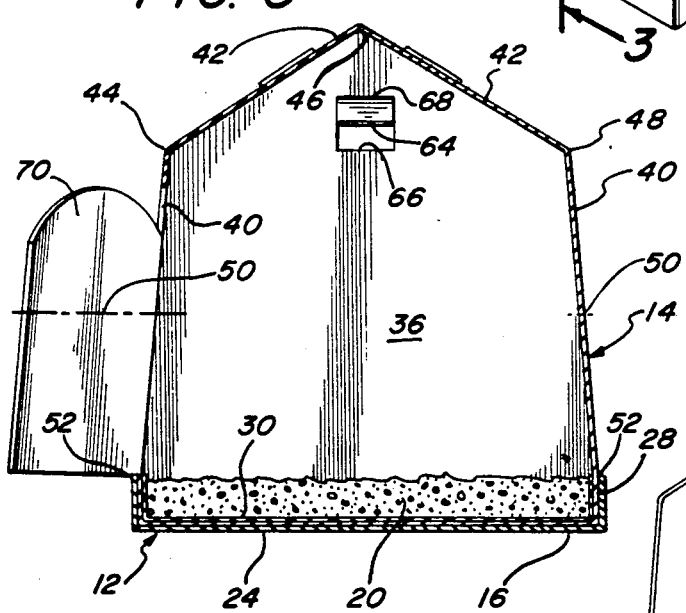
FIG. 3 is a cross-sectional drawing taken along line 3—3 of FIG. 2 showing construction of the cat litter box and the enclosure; and, FIG. 4 is an elevation drawing of one end of the enclosure.

More specifically, as shown in FIGS. 1–3, litter box 12 comprises a shallow, rectangular, tray-like structure having a bottom 24, two (2) opposing ends 26, and two (2) opposing sides 28. Overall dimensions may be about nineteen inches (19") by about fourteen inches (14"), with a height of about two inches (2"). A vapor barrier 30 is provided inside litter box 12, extending up ends 26 and sides 28, to protect the box against moisture from used litter 20, and to prevent leakage of moisture from the litter through the box. Preferably barrier 30 is formed from a plastic sheet and may, in fact, be part of a pouch which contains litter 20. Alternatively, barrier 30 may comprise a moisture-resistant coating that is sprayed or brushed onto the inside of litter box 12.

Enclosure 14 comprises two (2) opposite end panels 36 (FIGS. 1–4) and a central portion 38 which, in turn, comprises two (2) opposite side panels 40 and two (2) roof panels 42. Side panels 40 and roof panels 42 interconnect along respective first, second and third, longitudinal creased fold or bend lines 44, 46 and 48 (FIGS. 1–3). Formed longitudinally along enclosure side panels 40 are two (2) additional creased fold or bend lines 50. A lower edge of each enclosure side panel 40 is attached to the upper edge of a corresponding litter box side 28 along another creased fold or bend line 52 (best shown in FIG. 1). Collectively, the seven (7) bend lines 44, 46, 48, 50 (2), and 52 (2), enable the bellows-like collapsing (FIG. 1) and erecting (FIG. 3) of enclosure central portion 38.

End panels 36 (FIGS. 2–4) are constructed in a five-sided shape to fit within end regions of central portion 38 when such central portion is in the extended condition shown in FIG. 2. Each end panel 36 is connected to a corresponding upper edge of litter box ends 26 along a creased fold or bend line 58 (FIGS. 1 and 4), so that each end panel can be folded inwardly so as to extend longitudinally over the litter box when the enclosure is in the collapsed condition shown in FIG. 1.

Two (2) elongate, narrow ears 60 project upwardly from upper regions of each of end panels 36 (FIG. 2), one such ear being on each side of roof bend line 46. Two (2) corresponding slots 62 (FIG. 2) are formed in roof panels 42 at each end region thereof. When enclosure end panels 36 and central portion 38 have been unfolded and end panel ears 60 have been inserted into roof panel slots 62, enclosure 14 is locked into the extended condition. Enclosure end panels 36 and central portion 38 cannot be folded down onto litter box 12 until end panel ears 60 are pulled out of roof panel slots 62.

A square or rectangular fold-in tab 64 (FIGS. 2–4) is formed by a three-sided cut 66 in upper regions of each end panel 36. The pushing of tabs 64 inwardly, about a creased hinge line 68, enables end panels 36 to be grasped from the inside for pulling the end panel upwardly and outwardly from the collapsed position (FIG. 1) to the upstanding position (FIG. 2), in which ears 60 are inserted into mating roof slots 62. The openings formed when tabs 64 are pushed inwardly also serve as vent openings for the enclosure and enable air to circulate through enclosure 14 when the enclosure is in the extended condition (FIG. 2).

Access by a cat or the like into enclosure 14 when the enclosure is in its extended condition is enabled by an entry "door" 70 cut into one of enclosure side panels 40 (FIG. 2). Alternatively, door 70 may be cut into one of enclosure end panels 36. Preferably, access door 70 is left attached to its side panel 40 along a vertical, creased hinge line 72, so that the door can be folded flat with the end panel when enclosure 14 is collapsed. Door 70 not only permits a cat or the like access to enclosure 14 when the enclosure is unfolded to its extended condition, but also permits access to litter box 12 for cleaning litter 20 from the box and/or for adding fresh litter to the box.

Figure 4:
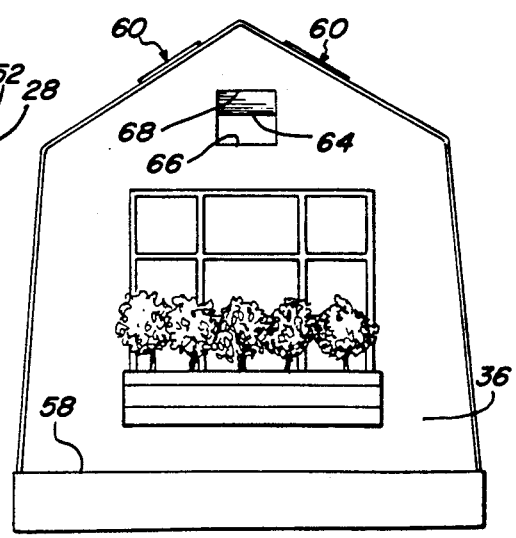

Although the exposed, outer surfaces of litter box 12 and enclosure may be left plain (that is, in the natural pasteboard finish), it is preferred, for esthetic reasons, that such surfaces be decoratively finished. Accordingly, as shown in FIGS. 1, 2, and 4, the outer surfaces may be decoratively printed so that litter box 12 and enclosure 14 resemble a cottage or house, complete with outlines of windows, shutters, window boxes, plants, and so forth. The decorative printing may be in black and white, or may be in color. Other exterior designs may be applied to litter box 12 and enclosure 14.

Cover or lid 16 (FIG. 1 is preferably about the height of litter box 12 with enclosure 14 folded down onto the box, so that the lid can be set downwardly onto the box and folded-down enclosure, and cover both. A printed panel 75 on a top surface 74 of lid 16 may be provided with instructions regarding unfolding or enclosure 14 and locking of the enclosure into the extended condition.

Although there is described above a specific arrangement of a covered cat litter box apparatus in accordance with the present invention for the purpose of illustrating the manner in which the invention can be used to advantage, it is to be appreciated that the invention is not limited thereto. Accordingly, any and all variations and modifications which may occur to those skilled in the art are to be considered to be within the scope and spirit of the invention, as defined by the appended claims.

What is claimed is:

1. A cat litter box apparatus which comprises:
   (a) a relatively shallow litter box sized for holding a quantity of cat litter or the like, the litter box including ends with upper edge regions and sides with upper edge regions;
   (b) a collapsible enclosure attached to said litter box, said enclosure being configured for folding and unfolding between an extended, use position in which the enclosure at least substantially covers the cat litter box while permitting a cat to enter the enclosure and use the litter box; and, a collapsed, shipping, storage, and disposal condition in which the enclosure lies flat on top of, or in, the litter box, the enclosure including first and second end panels having lower edge regions, the lower edge regions of the end panels being foldably connected to corresponding upper edge regions of the ends of the litter box, and first and second side panels having upper and lower edge regions and a roof having side edge regions, the lower edge regions of the side panels being foldably connected to the corresponding upper edge regions of the sides of the litter box, and the side edge regions of the roof being foldably connected to corresponding upper edge regions of the side panels, so that the roof and side panels form one piece, the side panels including a longitudinal fold line enabling movement of the side panels and roof between extended and collapsed conditions, and the end panels being moveable between a downward collapsed position and an extended position engaged with end edge regions of the roof to support the roof and side panels in the extended condition.

2. The litter box apparatus as claimed in claim 1, including a relatively shallow cover for covering the litter box when the enclosure is in the collapsed condition.

3. The litter box apparatus as claimed in claim 1, including means for detachably connecting upper edge regions of the end panels to end edge regions of the roof when the enclosure is in the extended condition.

4. The litter box apparatus as claimed in claim 1, wherein at least one (1) of the side or end panels is formed having means defining an opening through which a cat or the like can enter and exit the enclosure when the enclosure is in the extended condition.

5. The litter box apparatus as claimed in claim 1, including a vapor barrier and means for installing the vapor barrier inside the litter box, so as to protect the box.

6. The litter box apparatus as claimed in claim 1, wherein the litter box and the enclosure are constructed of heavy pasteboard.

7. A cat litter box apparatus which comprises:
   (a) a relatively shallow litter box having ends and sides with upper edge regions and sized for holding a quantity of cat litter or the like;
   (b) a collapsible enclosure attached to said litter box, said enclosure being configured for folding and unfolding between an extended, use position in which the enclosure at least substantially covers the cat litter box, while permitting a cat to enter the enclosure and use the litter box; and, a collapsed, shipping, storage, and disposal condition in which the enclosure lies flat on top of, or in, the litter box, the enclosure comprising:
   (i) first and second end panels having lower edges foldably connected to corresponding upper edge regions of ends of the litter box;
   (ii) first and second side panels having upper and lower edges and a roof having end edge and side edge regions, the lower edges of said side panels being foldably connected to corresponding upper edge regions of sides of the litter box, side edge regions of the roof being foldably connected to corresponding upper edge regions of the side panels so that the roof and side panels form one (1) piece, the side panels including a longitudinal fold line enabling movement of the side panels and roof between extended and collapsed conditions, and the end panels movable between a downward, collapsed position and an extended position engaged with the end edge regions of the roof to support the roof and side panels in the extended condition; and,
   (iii) means for detachably connecting upper edge regions of the end panels to end edge regions of the roof when the enclosure is in the extended condition.

8. The litter box apparatus as claimed in claim 7, wherein at least one (1) of the side or end panels is formed having means defining an opening through which a cat or the like can enter and exit the enclosure when the enclosure is in the extended condition.

9. The litter box apparatus as claimed in claim 7, including a relatively shallow cover for covering the litter box when the enclosure is in the collapsed condition.

10. The litter box apparatus as claimed in claim 7, including a vapor barrier and means for installing the vapor barrier inside the litter box, so as to protect the box.

11. The litter box apparatus as claimed in claim 7, wherein the litter box and the enclosure are constructed of heavy pasteboard.

12. A cat litter box apparatus which comprises:
(a) a relatively shallow litter box having ends and sides with upper edge regions and sized for holding a quantity of cat litter or the like;
(b) a vapor barrier and means for installing the vapor barrier inside the litter box, so as to protect the box; and,
(c) a collapsible enclosure attached to said litter box, said enclosure being configured for folding and unfolding between an extended, use position in which the enclosure at least substantially covers the cat litter box while permitting a cat to enter the enclosure and use the litter box; and, a collapsed shipping, storage, and disposal condition in which the enclosure lies flat on top of, or in, the litter box, the enclosure comprising:
(i) first and second end panels having lower edges foldably connected to corresponding upper edge regions of the ends of the litter box so as to be movable between a downward collapsed position and an extended position;
(ii) first and second side panels having upper and lower edges, and a roof having end and side edges, the lower edges of said side panels being foldably connected to corresponding upper edge regions of sides of the litter box, and the side edges of the roof being foldably connected to corresponding upper edges of the side panels, so that the roof and side panels form one (1) piece, each of the side panels being constructed having a longitudinal fold line enabling the folding and unfolding of the enclosure between the extended and collapsed conditions, the roof and side panels being supported in the extended condition by the extended end panels;
(iii) means for detachably connecting upper edge regions of the end panels to end edge regions of the roof when the enclosure is in the extended condition; and
(iv) an opening through at least one of the side or end panels to permit an animal to enter and exit the enclosure.

13. The litter box apparatus as claimed in claim 12, including a relatively shallow cover for covering the litter box when the enclosure is in the collapsed condition.

14. The litter box apparatus as claimed in claim 12, wherein the box and the enclosure are constructed of heavy pasteboard.

* * * * *